Nov. 21, 1961  W. GRIESELHUBER  3,009,683
SUGAR MINGLER SHAFT MOUNTING
Filed Nov. 7, 1958
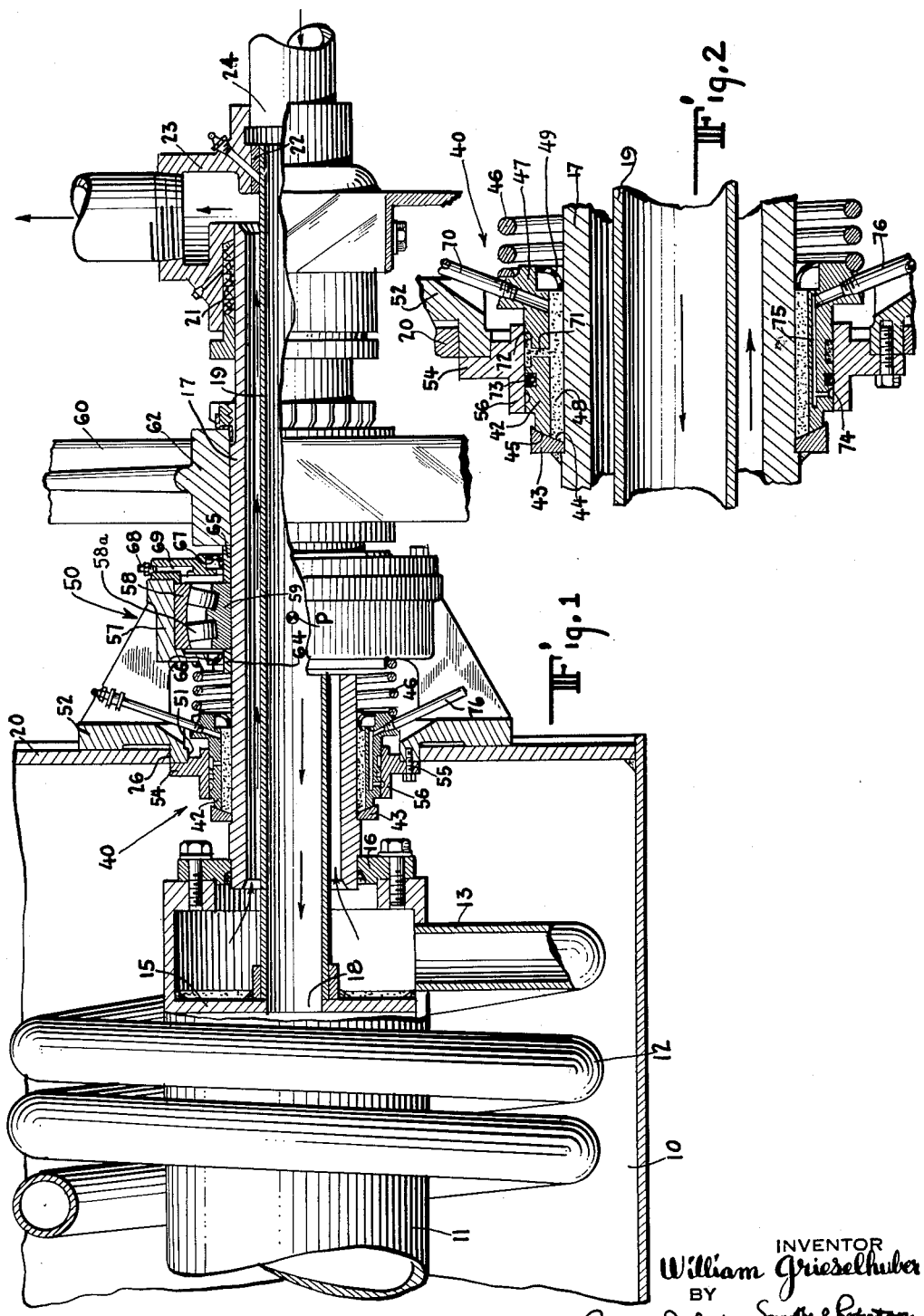
INVENTOR
William Grieselhuber
BY
Pollard, Johnston, Smythe & Robertson
ATTORNEYS United States Patent Office 3,009,683
Patented Nov. 21, 1961

3,009,683
SUGAR MINGLER SHAFT MOUNTING
William Grieselhuber, Hamilton, Ohio, assignor to The Western States Machine Company, Hamilton, Ohio, a corporation of Utah
Filed Nov. 7, 1958, Ser. No. 772,452
4 Claims. (Cl. 257—79)

This invention relates to a mingler for temperature conditioning massecuites and magmas before centrifuging in the manufacture or the refining of sugar. More particularly, it is concerned with an improved self-aligning bearing and sealing arrangement for the rotatable heating and stirring device in the mingler tank.

In the manufacture or the refining of sugar, heat is supplied to the massecuite or magma under carefully controlled conditions as the material is held in a tank in readiness for delivery into centrifugal machines. The heating serves to decrease and hold uniform the viscosity of successive charges of the material delivered to the centrifugals. This conditioning of the massecuite may be accomplished by a mingler of the type disclosed in United States Patent No. 2,654,364 to Joseph Hertrich. In such a mingler a heavy shaft rotatably supporting a massive heating and stirring device is itself supported only by end bearings so that the shaft may sag between its ends and rotate in an eccentric manner with radial displacements of its axis during the operation of the mingler.

It is important that the driven end of the shaft, which also is the end that receives and discharges the heating fluid for the mingler, be mounted relative to an end wall of the mingler tank so that it can undergo eccentric or oscillatory movements without over-straining its bearings or the tank wall and without either leaking the heating fluid into the massecuites or magma or allowing the latter to leak from the tank. It is also important that the bearing and sealing structures provided for mounting the driven end, be protected against becoming frozen immovably in the event of massecuite seeping between the sealing elements and freezing there to a hard condition.

One of the objects of the present invention is to provide a heavy mingler having an improved rotary bearing and sealing arrangement which supports the driven end of the mingler shaft for eccentric or oscillatory rotation of the mingler relative to an end wall of the mingler tank and provides for the sealed inflow and outflow of the heating fluid through the driven end of the shaft, yet keeps the shaft sealed to the end wall in all the relative positions assumed by those parts under varying operating conditions.

Another object of the invention is to provide such a bearing and sealing arrangement wherein a seal is formed by co-engaging surfaces of elements associated respectively with the end wall of the mingler tank and with the mingler shaft, and whereby any sugar material coming into contact with parts of those surfaces inside the tank is prevented from freezing thereon or is loosened so that it will not obstruct the required relative movement of the parts.

The foregoing and other objects, features and advantages of this invention will become apparent from the following detailed description of an illustrative embodiment, while the new features of construction and operation which I claim as my invention will be set forth more particularly in the appended claims. The detailed description refers to the accompanying drawing which forms a part hereof and in which:

FIG. 1 is a fragmentary longitudinal elevation of a portion of the mingler and of a bearing and sealing arrangement supporting the driven end thereof, with certain portions being shown in sections; and FIG. 2 is an enlarged vertical section of the shaft sealing structure shown in FIG. 1.

Referring to FIG. 1, a lower corner portion of a conventional mingler tank is shown at 10, having a heavy rotary assembly, comprising a massive shaft 11 and at least one heating coil 12, extending along the bottom of the tank. The shaft 11 is of a strength sufficient to support the weight of the rotary assembly between bearings located at its opposite ends, without requiring inboard bearings. The shaft is made hollow and of large diameter to serve also as a conduit for the heating fluid and to contribute substantially to the effective heating surface area provided by the assembly of the shaft and the coil or coils carried thereon.

The tank itself may be of any suitable shape, such as trough-like or U-shaped in cross-section. Loading spouts (not shown) are connected in known manner with the lower portion of the tank for the delivery of massecuite or magma from the tank into underlying centrifugal machines. For these and other details of suitable working arrangements of such minglers see, for example, United States Patents Nos. 2,086,951 and 2,128,873.

The coil 12 or a series of such coils is wound spirally around the shaft 11 and extends substantially throughout its length. One end of the coil at 13 is connected with a chamber 14 formed in the end of shaft 11 between a partition 15 in the shaft and the end wall 16 thereof. The chamber 14 in turn is connected with a hollow extension of shaft 11, shown at 17, which extends through an opening in the tank end wall 20, conducts the heating fluid away from the mingler, and supports the shaft 11 and coil 12 rotatably in the manner hereinafter described. The remote end of the coil is connected with the interior of shaft 11 beyond partition 15, and the heating fluid for the mingler is fed into that end through an opening 18 in partition 15 and a tube 19 which extends through shaft 17 and chamber 14 to a connection with opening 18. The ends of extension 17 and tube 19 beyond the end wall 20 extend into sealed rotatable connections at 21 and 22, respectively, with an offtake chamber 23 and an intake duct 24 for the mingler heating fluid.

The drawing shows the principles and details of one form of a bearing and sealing arrangement provided for the driven end or extension 17 of the mingler shaft according to the present invention. The other end of the shaft may be supported in any suitable self-aligning bearing, for example, as shown in said Hertrich U.S. Patent No. 2,654,364.

Between its sealed end connections inside and outside the mingler tank, at end wall 16 and fluid chamber 23, respectively, the supporting shaft 17 is provided with: (1) a self-aligning sealing structure generally indicated by numeral 30 in FIGS. 1 and 2, which keeps the shaft constantly in sealed relation to the tank end wall 20; (2) a self-aligning outboard bearing at 50, through which the load of one end of the mingler coil and shaft is borne by end wall 20; and (3) a driving wheel or sprocket 60 which has its hub 62 splined to shaft 17 beyond the bearing 50 and serves to rotate the mingler.

The self-aligning sealing and bearing structures at 40 and 50 provide for the continuous support of the driven end of the mingler and keep it constantly in sealed relation to the end wall of the tank irrespective of changes of the relative positions of the shaft 17 and end wall 20 that occur with any elastic deformation or sagging of shaft 11 and with "breathings" or variations of the relative positions of the tank walls which take place with variations of the volume and pressure or of the temperature of the sugar material held in the tank.

The end wall 20 is formed with an opening 26 in which is fitted the inner flange 51 of a massive bearing hanger 52 held to the outer side of that wall. A ring 54 at the inner side of wall 20 is bolted to flange 51 through the opening 26, as by bolts 55, and forms within the opening a cylindrical sleeve 56 to support a part of the sealing structure.

The hanger 52 extends away from opening 26 to an annular bearing housing 57 which holds a spherical outer race 58 for roller bearings 58a that run on an inner race 59 fixed to the hollow shaft extension 17. Rings 64 and 65 fixed to that extension hold the inner bearing race in a fixed position thereon. Glands 66 and 67 extending from the housing 57 engage those rings to seal the space within the bearing. A fitting 68 and passage 69 are provided in the housing for lubrication of the bearing.

The bearing 50 sustains the load of the driven end of the mingler by holding the shaft extension 17 in a radially fixed relation to the point P at the center of curvature of the spherical bearing race 58. By virtue of the self-aligning quality of the bearing, the shaft is free to sag and oscillate or move eccentrically at any location away from that center point. Any such eccentric motion, however, is necessarily accompanied by oscillatory radial movements of the shaft 17 relative to the end wall 20 and sleeve 56.

The necessary sealing of the space between the shaft 17 and the wall 20 in the course of those oscillatory movements is obtained as follows:

A cylindrical ring 42 is slidably sealed in close fitting relation to the cylindrical sleeve 56. A cooperating end ring 43 rigidly fixed to the shaft 17 provides a spherical bearing surface 44 for a spherical end surface 45 of sleeve 56 inside the mingler tank. A heavy compression spring 46 bears strongly against an end 47 of sleeve 56 located outside the mingler tank, thus holding the spherical inner end 45 constantly in tight sealing engagement with the spherical surface 44 of ring 43.

The sealing spherical surfaces at 44 and 45 have their center of curvature at the same point P as the bearing 50 so that they stay tightly sealed together under the pressure of spring 46 in all the positions of rotation and oscillation of the mingler shaft. The ring 42 is spaced away from shaft 17 by a distance sufficient to keep it clear of the shaft in all of those positions.

It results that the mingler shaft will remain in a completely sealed relation to the end wall of the tank in all the various conditions of oscillation of the shaft.

In order to keep the seal functioning properly without undue wear or friction or corrosion, provisions are made for continuously lubricating the spherical surfaces at 44 and 45 and for lubricating and sealing the meeting surfaces of sleeve 56 and sliding ring 42. To those ends, the space 48 between shaft 17 and ring 42 is closed at its outer end by a sealing gland 49, and a fitting 70 is provided in the outer end of the ring for the introduction of a lubricant into space 48. The lubricant flows directly through that space to spherical surface 44. It flows to the surface of sleeve 56 through a radial passage 71 and an annular groove 72 in ring 42. Leakage of the lubricant from groove 72 to the interior of the mingler tank is prevented by an O-ring seal 73 between ring 42 and sleeve 56.

While the structures thus far described are fully capable of maintaining the required seal during periods of operation of the mingler, it will be evident that the sugar material held in the tank 10 is able to reach exposed parts of the sealing surfaces of ring 43, sleeve 56 and/or ring 42 as the shaft rotates; and when the mingler is not in use, such as at times when sugar factory or refining operations are shut down for week-end or vacation periods, the sugar material on the sealing surfaces may freeze there to a hard condition that would prevent the proper operation of the bearing and sealing structures upon resumed use of the mingler.

Freezing problems of that kind are prevented according to this invention, or are overcome if allowed to occur, by flowing water to those parts of the sealing surfaces which are accessible to the sugar material. For this purpose, the ring 42 is formed with an annular groove 74 facing sleeve 56 near the inner end of the sleeve, and a duct 75 in the ring leads to groove 74 from a water intake fitting 76 (see FIG. 2). Water is supplied to the fitting under a pressure, for example, of ten pounds per square inch, so that there will be a seepage of water between the parts 42 and 56 at their inner ends and thence to the outer part of spherical surface 44. This water dissolves or softens any sugar crust formed or tending to form on the sealing surfaces. The amount of water required is not great enough to dissolve an appreciable amount of crystallized sugar in the tank.

It will be obvious that many variations may be made in the details of construction of apparatus embodying my invention without departing from the new contributions of the invention, which are intended to be defined by the appended claims.

I claim:

1. In an apparatus for conditioning sugar massecuite or magma, including a horizontally elongated tank to hold a variable mass of the material and a rotatable mingler within said tank, said mingler comprising a massive hollow shaft carrying a heating coil and having at one end a supporting extension passing through and beyond an end wall of the tank, a self-aligning bearing and sealing arrangement for said extension comprising a rigid hanger secured to said end wall around said extension, a self-aligning bearing supported by said hanger outside said tank, said extension being mounted in said bearing for oscillatory rotation of said shaft about a fixed center point of said bearing, a sleeve surrounding said extension adjacent to said end wall and fixed in rigid relation to said hanger, a first rigid sealing ring slidable within said sleeve in engagement therewith, said ring surrounding said extension in spaced relation thereto, a second rigid sealing ring fixed to said extension in position to be butted by the inner end of said first ring, and means for continuously pressing said first ring strongly against said second ring to maintain a seal between their butting surfaces, said surfaces being spherical and having their center of curvature located at said center point of said bearing so that said seal is maintained in all the conditions of rotation of said shaft.

2. In an apparatus as described in claim 1, means for introducing a lubricant into the space between said rings and said extension, an annular lubricating groove between the meeting surfaces of said slidable ring and said sleeve, and a passage through said slidable ring for conducting lubricant from said space to said groove.

3. An apparatus as described in claim 1, and means for flowing water to co-engaging surfaces of said sleeve and said rings accessible to material held in said tank.

4. In an apparatus as described in claim 1, means for introducing a lubricant into the space between said rings and said extension, an annular lubricating groove between the meeting surfaces of said slidable ring and said sleeve, a passage through said slidable ring for conducting lubricant from said space to said groove, a second annular groove between said meeting surfaces at a location between said lubricating groove and the inner end of said sleeve, a resilient sealing ring between said surfaces at a location between said grooves, and means including a passage in said slidable ring leading to said second groove for flowing water to co-engaging surfaces of said sleeve and said rings accessible to material held in said tank.

References Cited in the file of this patent

UNITED STATES PATENTS 2,654,364    Hertrich                Oct. 6, 1953